United States Patent Office 3,647,554
Patented Mar. 7, 1972

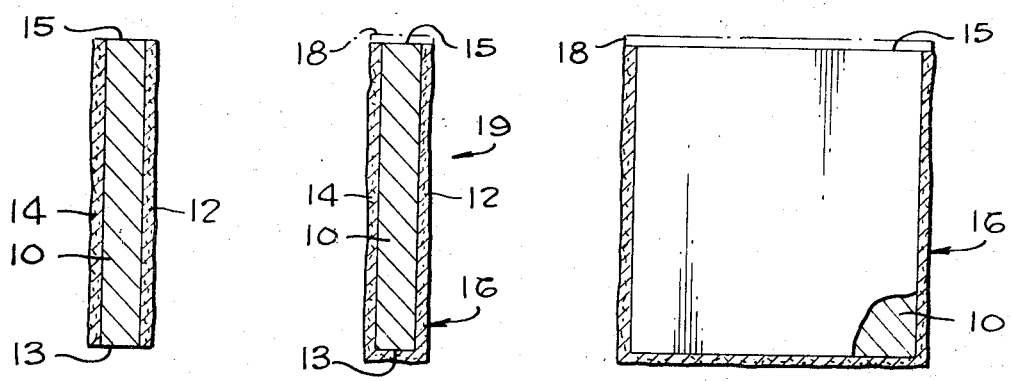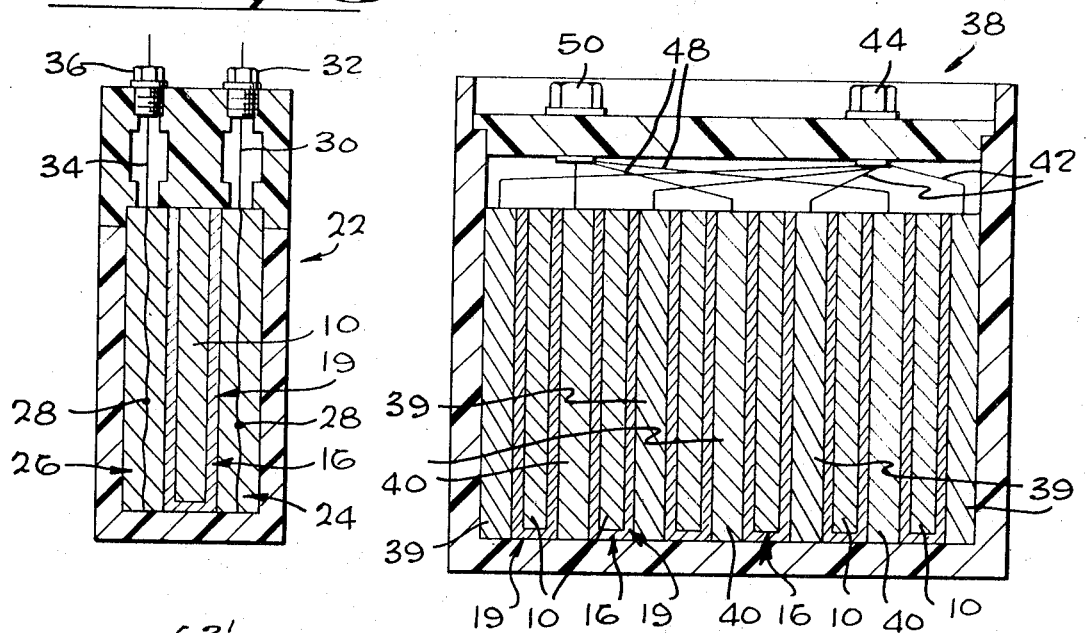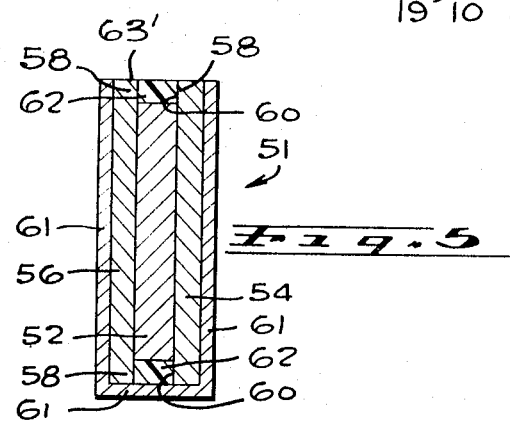

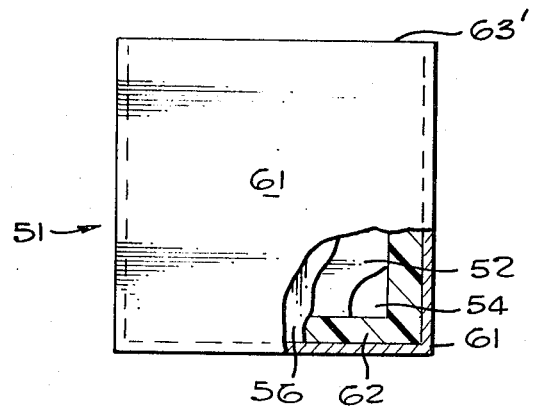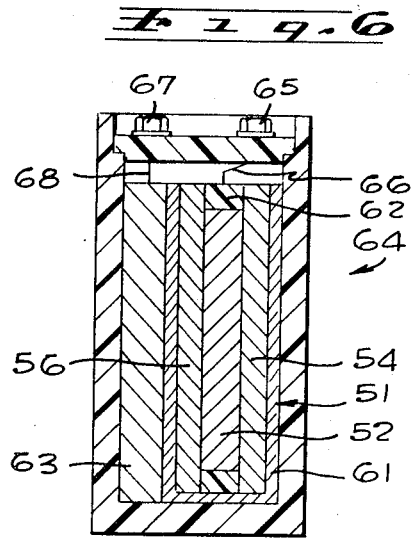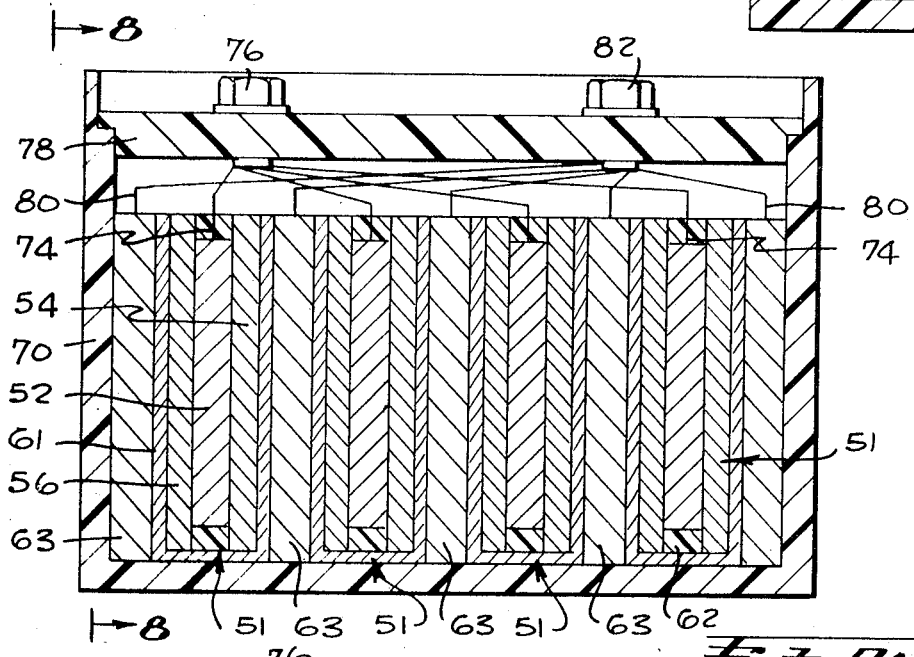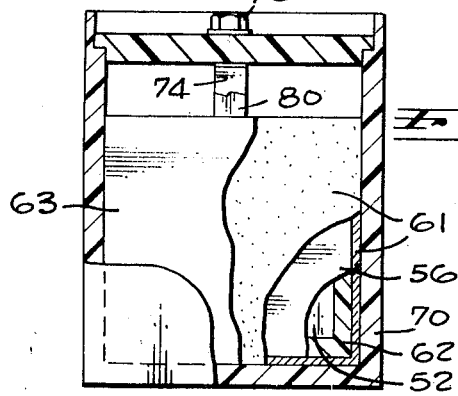

3,647,554
BATTERY SEPARATOR AND METHOD OF PRODUCING SAME
Frank C. Arrance, Costa Mesa, and Albert G. Rosa, Placentia, Calif., assignors to McDonnell Douglas Corporation, Santa Monica, Calif.
Filed Apr. 17, 1969, Ser. No. 817,085
Int. Cl. H01m 3/02
U.S. Cl. 136—145                          21 Claims

ABSTRACT OF THE DISCLOSURE

Production of an improved separator having extended life, particularly over a large number of deep discharge cycles when employed in a high energy density battery, such as a silver-zinc battery, by overcoating a rigid inorganic separator, with a thin layer of a flexible substantially inorganic separator film, the inorganic material of the rigid separator and of the flexible overcoating being the same, or different, inorganic materials. Thus the inorganic separator material for the rigid separator and flexible overcoating can be a solid solution of magnesium silicate and iron silicate; or the inorganic material of the rigid separator can be the latter inorganic material and the inorganic material of the flexible separator can be zirconia.

---

This invention relates to production of improved substantially rigid inorganic separators, and is especially concerned with the production of a substantially rigid inorganic separator including means and designed for extended use in a high energy density battery, particularly when subjected to a large number of deep discharge cycles, and which continues to function even though the rigid separator may develop cracks or delaminate during such extended operation.

The invention is also concerned with procedure for producing such improved, long-lived separators or membranes and to batteries incorporating same.

Batteries are an important source of energy storage for power generation. In addition to the common lead-acid storage battery, an important type of battery is the high energy density alkaline electrolyte battery using such electrode combinations as silver-zinc, silver-cadmium and nickel-cadmium. High energy density batteries are generally battery systems which have a substantially higher energy per unit of weight than conventional, e.g., lead-acid, storage batteries. Such high energy density batteries have many applications such as in portable tools and appliances, television, radio and record players, engine starting, portable X-ray units, and the like. In such batteries, it is conventional to employ a separator in the form of a porous member between the electrodes.

In high energy density batteries such as silver-zinc, nickel-cadmium and silver-cadmium, the separator performs the function of retaining electrolyte, e.g., potassium hydroxide, separating the electrodes, and permitting transfer of electrolyte ions but preventing migration of electrode ions or growth of dendritic crystals of electrode ions which short circuit the battery.

Improved inorganic separators in the form of certain aluminosilicates which are particularly suited for use in high energy density batteries are described, for example, in Pat. No. 3,379,570. Such inorganic separators, preferably in the form of sintered ceramic separators, when assembled in a battery of this type, e.g., a silver-zinc high energy density battery, have resulted in substantially improved battery life at both ambient temperature and elevated temperature, that is, a battery capable of operating efficiently over a large number of discharge-charge cycles, and such batteries are also operable at high temperature, e.g., of the order of 100° C. and above.

Although inorganic, rigid separators, e.g., of the type noted above, have been successfully used in silver-zinc and other high energy density batteries, battery failure can result from expansion of electrodes, particularly the zinc electrode, after a large number of deep discharge cycles. This expansion causes battery failure, for example, due to cracking of the rigid separator. Accordingly, means have been sought to prevent such cracking or disintegration of the inorganic separator, resulting from expansion of the electrodes during operation of a high energy density battery, particularly to improve the deep discharge life of high energy density batteries such as silver-zinc batteries, incorporating such inorganic separators.

It has now been found according to the invention that by applying to a porous, rigid inorganic separator, a flexible, porous, substantially inorganic separator film, an improved inorganic separator is provided having increased resistance to failure and reduced tendency to cause shorting, when such separator is incorporated into a high energy density battery, e.g., a silver-zinc battery, and such battery subjected to a large number of deep discharge cycles. Thus, the deep discharge life of such batteries can be greatly increased by such overcoating of the rigid inorganic separator with a thin layer of inorganic flexible porous composite separator material.

Thus, for example, whereas conventional silver-zinc 5 a.h. (ampere hour) batteries constructed with rigid inorganic separators employing as inorganic material a solid solution of magnesium silicate and iron silicate are capable of about 30 total discharge cycles before failing due to separator cracking, improved batteries fabricated in the same manner, but having a 0.003" thick overcoating of flexible inorganic separator material described below and containing chiefly ground particles of magnesium silicate and iron silicate solid solution, have been cycled for substantially more than fifty cycles.

It is believed that the substantial increase in deep discharge cycle life provided employing the improved separator of the invention in the form of a rigid inorganic separator containing a thin, porous, flexible overcoating, or film, is due to the fact that although the rigid separator may develop cracks or tend to lose structural integrity from internal pressure generated by expansion of a battery electrode such as the zinc electrode, the electrode-separator compartment remains electrically intact and prevents shorting to the silver electrode because of the flexibility of the thin overcoat of the flexible, inorganic composite material which remains intact in spite of such cracking or disintegration of the rigid separator.

Further, it has been found that where an olivine (magnesium silicate-iron silicate) solid solution or other iron-containing rigid inorganic separator, e.g. ferrochromite or spinelloids, is employed in contact with a zinc electrode, gassing of the battery occurs due to reaction of the zinc of the electrode with the iron content in such iron-containing, e.g. olivine, separator, forming hydrogen gas, which is undersirable particularly in sealed batteries.

By employing the invention principles utilizing a flexible substantially iron-free inorganic separator film, e.g. composed of zirconia, thoria, alumina, and the like, over the rigid iron-containing, e.g. olivine, separator, such gassing does not occur or is substantially reduced, due to separation of such iron-containing separator from the zinc electrode by the flexible inorganic separator of different iron-free inorganic separator material. This is of particular importance in the production of successful long lived sealed batteries.

According to the invention, the flexible, porous coating or film composed essentially of an inorganic material, is applied to the porous, rigid separator by contacting the rigid separator with a mixture of a major portion of a porous particulate inorganic or ceramic material, a minor portion of potassium titanate, preferably in the form of short fibers, and a minor portion of a curable organic polymer, such as polyphenylene oxide, capable of bonding the particles of the inorganic material and the potassium titanate fibers together upon curing and forming a porous structure, the polymer being dissolved in a suitable solvent, such as chloroform, removing the solvent from the applied film, as by air drying, and heating the film at elevated temperature, generally within the range noted below, to cure the polymer and cause same to bond the inorganic material and potassium titanate particles into a porous, substantially inorganic flexible uniform coating of low electrical resistivity, over the surface of the rigid inorganic separator.

The inorganic separator material which can be used to form the flexible separators of the rigid-flexible inorganic separator combination of the invention can include a variety of porous inorganic or ceramic substances in powder or particulate form. Thus, for example, suitable inorganic separator materials include insoluble hydrous metal oxides such as the hydrous oxides of zirconium, titanium, antimony, tungsten, silicon, scandium, bismuth, vanadium, aluminum and cerium in particulate form. A preferred separator of this type is hydrous zirconium oxide or zirconia.

Other porous inorganic materials which can be employed for producing the separator according to the invention include particulate sintered aluminosilicates, especially the alkali metal and alkaline earth metal aluminosilicates and alumina, because of their formation of a hard ceramic material upon sintering, while still retaining suitable porous characteristics. The aluminosilicates of suitable porous internal structure are particularly preferred in this respect. Examples include nonfluxed aluminosilicate, fluxed aluminosilicates or salts thereof, such as sodium and potassium aluminosilicates, and magnesium, calcium, barium and strontium aluminosilicates, e.g., magnesium aluminosilicate (cordierite). These materials can be used separately, but often mixtures of these particulate aluminosilicates are used, e.g., complex mixtures of both the alkali metal and alkaline earth metal aluminosilicates. Such aluminosilicate separator materials are described in the above Pat. No. 3,379,570.

Another useful class of inorganic separator materials are the naturally occurring clay minerals of the kaolinite group. This is a group of naturally occurring clays containing aluminum oxide and silica, usually together with bound water, and having the formula $Al_2O_3 \cdot 2SiO_2 \cdot 2H_2O$. In addition to kaolinite, other useful members of this group include the mineral clays halloysite, dickite, nacrite and anauxite.

Other types of inorganic separator materials which can be employed include those in the form of a particulate sintered porous solid solution of magnesium silicate and a member selected from the group consisting of zinc silicate and iron silicate as described and claimed in the copending application Ser. No. 539,554, filed Apr. 1, 1966, of Frank C. Arrance et al., now Pat. No. 3,446,668, and which includes the naturally occurring magnesium-iron silicate solid solution known as the mineral olivine, and the inorganic separator materials in the form of a particulate sintered porous solid solution of an aluminum-bearing material such as aluminum oxide, and a substance selected from the group consisting of chromium, cobalt, nickel, magnesium, calcium and iron-bearing materials, e.g., a mixture of alumina and chromic oxide, as described and claimed in copending application Ser. No. 555,891, filed June 7, 1966, of Frank C. Arrance, et al., now Pat. No. 3,446,669.

Still another form of inorganic separator material which can be employed according to the invention are porous sintered separators consisting essentially of a solid solution of a major portion of magnesium oxide and a minor proportion of an oxide such as zirconium dioxide, chromic oxide, aluminum oxide, titanium oxide, and certain other oxides, as described in copending application Ser. No. 727,394, filed May 8, 1968 of F. C. Arrance et al., now Pat. No. 3,575,727.

Also inorganic separator materials derived from natural chromite, termed ferrochromite, and containing oxides of iron, magnesium, aluminum and chromium and formed into a sintered solid solution, as described and claimed in copending application Ser. No. 727,678 of F. C. Arrance, filed May 8, 1968, now Pat. No. 3,539,394, can be employed.

As further examples of inorganic separator materials which can be employed are sintered zirconia separators, e.g., calcia stabilized zirconia, sintered alumina and sintered thoria.

An exemplary form of calcia stabilized zirconia is produced by heating a mixture of 96% zirconia ($ZrO_2$), and 4% calcium oxide to temperature of the order of about 3000° F., to form a solid solution of calcium oxide and zirconium oxide, forming a mixture containing 97% of the resulting calcia stabilized zirconia and 3% bentonite, presintering such material at 1,000 to about 1,200° C., ball milling such sintered material to small particle size, compacting such material into separator membranes at pressures ranging, e.g., from about 2,000 to about 10,000 p.s.i., and sintering again to temperature of about 1,000 to about 1,200° C., to produce zirconia separator membranes or separator material.

An exemplary form of alumina separator material is formed by compacting alumina (aluminum oxides), e.g., at pressures of about 5,000 to 10,000 p.s.i., into membranes, and sintering such membranes at temperatures ranging from about 300° C., to about 1,800° C.

As a further example, inorganic separator materials formed from chrome-iron and known as spinelloids and formed of $FeO-CrO_3$ and comprising, e.g. 35 to 50% chromic oxide, together with some silica as magnesium silicates, can also be employed.

Additional inorganic materials in particulate form which can be employed include silicates such as magnesium silicate (fosterite), and the like.

Preferred inorganic separator materials are those selected from the group consisting of (a) a solid solution of magnesium silicate and iron silicate, (b) zirconia, (c) a solid solution of a major portion of magnesium oxide and a minor portion of an oxide selected from the group consisting of chromic oxide, zirconium dioxide, titanium dioxide and alumina (d) a solid solution of ferrochromite, (e) spinelloids and (f) alumina.

The term "inorganic separator materials" or "sintered ceramic separator material," as employed herein, is intended to denote any of the above noted sintered inorganic separator materials.

When employed for producing the porous, flexible film applied to the rigid separator, the inorganic separator material is in powder or particulate form. As previously noted, the same or different inorganic materials can be employed respectively in producing the porous, flexible film and the rigid inorganic separator.

It will also be understood that mixtures of the above inorganic materials can be employed in producing either the rigid inorganic separator or the flexible, porous separator film.

The organic polymeric materials incorporated with the inorganic or ceramic materials or powders noted above to produce the flexible membrane or separator of the invention are preferably chosen from those curable polymers which have the property of bonding the individual particles of inorganic materials and the potassium titanate fibers together upon curing of the organic polymer, but do not fill the voids between the ceramic material and potassium titanate particles, so as to result in a porous structure effective when used as a battery separator. A preferred polymeric material which has been found particularly advantageous is polyphenylene oxide (marketed as PPO by General Electric). Polysulfone can also be employed but results in a less porous separator of higher resistivity than when employing polyphenylene oxide. Also, polyamides such as nylon, neoprene rubber, polyepoxides, such as the polymer of bisphenol A and epichlorhydrin (the Epons), and fluorocarbon polymers such as vinylidene fluoride polymers (Kynar), and the copolymer of hexafluoropropylene and vinylidene fluoride (Viton) may be employed. In addition to having the properties of bonding the particles of inorganic material and potassium titanate together so as to form a flexible, strong, thin membrane having suitable porosity for use as a battery separator, such polymers should be resistant to attack by chemicals such as alkaline solutions, e.g., potassium hydroxide solution, employed in high energy density batteries, both at ambient and at elevated temperatures.

The above-noted polymeric materials are employed in particulate or granular form, and mixtures of such polymeric materials also can be employed.

As previously noted, it has been found that the potassium titanate, although in fiber form, preferably is used as very short fibers not longer than 0.008 inch, to avoid clumping and agglomeration of the mixture. It is also preferred that the inorganic or ceramic powder be ground to a particle size such that 95% of the particles of such inorganic material are of less than 10 micron particle size.

The relative proportions of inorganic or ceramic material, potassium titanate particles and organic polymeric binder employed for producing the flexible membranes of the invention can vary. The amount of ceramic powder and potassium titanate together preferably should be at least 50%, and preferably substantially greater than 50%, of the mixture, and the amount of either the ceramic material or the potassium titanate employed can be less than or in excess of 50% of the mixture; ordinarily, the inorganic or ceramic material is present in major proportion and the potassium titanate in minor proportion. The amount of polymeric material can vary widely and can constitute as much as 50% or more of the mixture, but under these conditions the result is a separator of increased internal resistance, although having greater flexibility. Hence, in preferred practice, the organic polymeric material is employed in minor proportions to obtain sufficient bonding and porosity, yet to afford substantial flexibility. Thus, for example, generally there can be employed from about 50% to about 95% of inorganic or ceramic powder, about 2% to about 35% potassium titanate fibers, and about 2% to about 48%, by weight, of organic polymeric material. The proportion of polymeric material employed in combination with the mixture of ceramic material and potassium titanate is chosen to provide a membrane or separator of good flexibility and film strength, yet which has low resistivity and other characteristics permitting the membrane to function efficiently as a battery separator, especially in high energy density alkaline batteries.

The organic polymer is dissolved in a volatile solvent which dissolves the polymer and which has good volatility to permit quick removal from the coated film. Any suitable solvent having these characteristics can be employed. The particular solvents chosen depends in large measure on the particular polymer employed. Thus, for example, chloroform, trichloroethylene, toluene, mixtures of chloroform and carbon tetrachloride, and mixtures of chloroform and trichloroethylene have been found suitable for use with polyphenylene oxide polymer. Dimethyl acetamide has been found suitable for use with polysulfone and fluorocarbon polymers, and toluene has been found suitable for employment with neoprene rubber and epoxy material. The amount of solvent employed can vary, but generally the amount employed is such that the organic or polymeric solids content ranges from about 20 to above 70 parts per 100 parts by weight of solvent, the amount of solvent used being such that it is readily evaporated in a conveniently short time after film formation.

It has also been found advantageous to incorporate with a curable organic polymer employed in producing the flexible, porous film, a minor portion of an organic component selected from the group consisting of monomeric and polymeric azelate, pelargonate and oleate esters. These materials are incorporated in the above noted solvent with the curable, organic polymer, employing a common solvent, e.g., chloroform, for both the curable organic polymer and the above noted organic component. Such monomeric or polymeric esters aid in producing a highly flexible film which is very thin, e.g. of the order 0.001", yet which is rugged and durable, and in reducing the resistivity of such film.

Typical examples of monomeric azelates, pelargonates and oleates, which can be employed, are di-2-ethylhexyl azelate, di-isooctyl azelate, and di-n-hexyl azelate; di-ethylene glycol dipelargonate, triethylene glycol dipelargonate, butanediol dipelargonate and 2-butoxyethyl pelargonate; tetrahydrofurfuryl oleate and diethylene glycol monooleate. Examples of preferred polymers are polypropylene and polyethylene polyazelates, particularly the former. These polymers or polyazelates generally have an average molecular weight range from about 850 to about 6,000, and are particularly preferred for production of improved flexible separators of the invention. Such polymers can, but do not necessarily, contain additives incorporated therein, e.g., to control molecular weight by functioning to retard or prevent further polymerization of such polymers. These additives can include phthalates such as dioctyl phthalate, alkanoates and alkanes, having, e.g., from 8 to 16 carbon atoms, such as decanoic acid, and the like. The term "polypropylene polyazelate phthalate alkanate" as employed herein is intended to denote polypropylene polyazelate polymer containing phthalate and alkanoate or alkane additives as above defined. Polymers containing such additives generally have a lower molecular weight as compared to the same polymer in the absence of such additives.

The above examples of monomeric and polymeric esters can range from very fluid to very viscous materials. Combinations of these esters can also be employed, such as a combination of polymeric azelate and a monomeric pelargonate.

The above noted monomeric and polymeric azelates, polargonates and oleates are marketed as "Plastolein" by Emery Industries, Inc. of Cincinnati, Ohio.

When employing such esters in combination with the curable organic polymer for producing the flexible film, the total amount of such organic components employed is within the above noted range of about 2% to about 48% by weight of total inorganic and organic solids. The proportion of the above monomeric or polymeric ester present in the mixture thereof with the curable organic polymer, e.g., polyphenylene oxide, can vary, but usually ranges from about 5% to about 50% by weight of such mixture.

The slurry of inorganic or ceramic powder, e.g. sintered solid solution of magnesium silicate and iron silicate, and potassium titanate particles, and the curable organic polymer, e.g., polyphenylene oxide, and also including the above noted monomeric or polymeric ester, e.g., azelate, when employed, dissolved in the solvent, is preferably maintained in vibration when the rigid inorganic separator is dipped or immersed in the slurry. The vibration of such mixture results in obtaining a uniform coating of the mixture on the rigid separator.

If desired, such slurry can be sprayed, brushed, or otherwise applied to the rigid separator surface. If spraying is employed, the amount of solvent employed in the slurry is increased to facilitate such spraying.

After the above noted slurry or mixture is applied as a coating to the rigid separator, the rigid separator containing such coating is subjected to air drying for solvent removal. The coating is then cured at temperatures which can range from about 100° to about 550° F., with the time of curing depending upon the particular polymer employed, the size of the particular surface area being covered, and other factors, including the temperature of cure. Curing time can range, for example, from about 10 to about 30 minutes, at the above elevated temperatures. Although air drying of the coated film for an extended period of time, e.g., of the order of about 24 hours or more, can eliminate curing at elevated temperatures, this is not preferred practice.

The thickness of the resulting flexible, substantially inorganic film or separator formed on the rigid inorganic separator surface can range, e.g., from about 0.0005 to about 0.025 inch, often from about 0.001 to about 0.008 inch in thickness.

The porosity of the flexible membranes or separators of the invention can range from about 10% to about 40%, but such range is understood to be only exemplary.

Pore sizes or diameters of the flexible, porous membranes generally range from about 1 to about 400 angstrom units, but can be outside this range.

The invention will be more clearly understood from the further description below of certain embodiments of the invention, taken in connection with the accompanying drawing, wherein:

FIG. 1 is an essentially schematic representation of a porous, rigid inorganic separator containing a flexible porous substantially inorganic separator film on opposite surface thereof according to the invention;

FIG. 2 is a schematic representation of a unit similar to that of FIG. 1, but in which the edge portions of the separator are also covered by a porous, flexible substantially inorganic separator film;

FIG. 2a is a side elevation of the unit of FIG. 2;

FIG. 3 shows the manner of assembly of the unit of FIG. 2 in a simple battery according to the invention;

FIG. 4 illustrates an assembly of a plurality of the units of FIG. 2 to form a multiplate battery;

FIG. 5 illustrates a separator unit in the nature of a pair of separators having an electrode sandwiched therebetween, the separators being sealed together by a sealant in an edge cavity between the outer edge portions of the separators and around the electrode, such unit containing a flexible, porous, inorganic separator film on the outer surfaces of the separators and around the outer edge portions;

FIG. 5a is a side elevation of the unit of FIG. 5, with parts broken away for clarity;

FIG. 6 illustrates the assembly of a simple battery employing the separator unit of FIG. 5 and 5a; and FIG. 7 shows the manner of assembly of a plurality of units illustrated in FIGS. 5 and 5a, to form a multiplate battery; and FIG. 8 is a side elevation taken on line 8—8 of FIG. 7, with parts broken away for purposes of clarity.

The showings in the drawings are exaggerated for purposes of greater clarity.

As illustrated in FIG. 1 of the drawing, the flexible membrane, or film, composed chiefly of inorganic material, can be applied as a securely adherent and flexible coating on opposite surfaces of an inorganic separator 10, as indicated at 12 and 14, according to the invention principles as described above. As previously noted, such flexible separator films 12 and 14 can be applied by spraying, brushing or dipping the inorganic separator 10 in a slurry or mixture, as noted above, containing inorganic material, potassium titanate particles and the bonding curable polymer, which may also include the above noted ester additives. For this purpose, the end surfaces 13 and 15 of the separator can be masked by suitable well known means, e.g. employing a conventional masking tape.

In FIG. 2 of the drawing there is illustrated the usual and preferred manner of applying a flexible film according to the invention to an inorganic separator. According to this embodiment, the inorganic separator 10 is dipped into a slurry or mixture as noted above, to form, following curing as described above, a flexible film in the form of an envelope 16, which completely encloses the separator along its bottom and side edges, as well as at the sides of the separator, to form an envelope around the separator, except for the upper surface 15 of the separator, as illustrated in FIGS. 2 and 2a. If desired, during the dipping operation for producing the flexible separator envelope 16, the separator can be immersed in the slurry so as also to cover the upper surface 15 of the separator, as indicated in dotted lines at 18. The embodiment of FIGS. 2 and 2a is preferred over that of FIG. 1, since the flexible separator film or envelope 16 provides more complete insulation between the electrode compartments containing electrodes placed on opposite sides of the unit 19 of FIGS. 2 and 2a, as more clearly indicated in FIG. 3.

The unit 19 illustrated in FIGS. 2 and 2a, in the form of a rigid inorganic separator having a flexible film 16 applied thereto, can be assembled in a battery 22, as illustrated in FIG. 3, together with zinc and silver electrodes 24 and 26, respectively, the separator member 19 having the flexible separator film 16, being disposed between the electrodes and in contact with the adjacent surfaces thereof. Each of the electrodes 24 and 26 has a collector grid 28 therein, the collector grid of the zinc electrode 24 being connected by a lead wire 30 to a terminal 32, and the collector grid 28 of the silver electrode being connected by a lead 34 to a terminal 36 on the battery.

An alkali solution such as a 30% to 40% potassium hydroxide solution can be employed as electrolyte in the battery.

Referring now to FIG. 4 of the drawing there is illustrated the incorporation of the separator unit 19 illustrated in FIGS. 2 and 2a, in the form of a rigid inorganic separator having an inorganic flexible separator film 16 thereon, in a multiplate battery 38. In this arrangement, it is seen that four silver electrodes 39 are alternately disposed in relation to three zinc electrodes 40, with the separator units 19 of the invention separating adjacent silver and zinc electrodes 39 and 40. Leads 42 from the silver electrodes 39 are collectively connected to the terminal 44, and leads 48 from the zinc electrodes 40 are collectively connected to the terminal 50. It is seen that the separator units 19 each insulates the respective silver and zinc electrode compartments.

Referring now to FIGS. 5 and 5a of the drawing, there is illustrated a "wafer" type construction 51 forming an electrode-separator unit, in which an electrode 52, e.g., in the form of a zinc plate, is centered between a pair of opposite rigid inorganic separators 54 and 56, the separators 54 and 56 having substantially the same shape as the electrode 52, but being of a somewhat larger size than electrode 52 so that when the electrode is centered and sandwiched between separators 54 and 56, the outwardly extending overlapping edge portions 58 of the respective separators 54 and 56 form therebetween a cavity 60 completely around the outer edges of the electrode 52. Such edge cavity 60 is filled with a suitable filler material 62, such as an epoxy resin, which upon curing bonds the overlapping edge portions 58 of the opposite inorganic separators 54 and 56 together. In addition to an epoxy, any suitable filler material 62 can be employed for filling the edge cavity 60, which is inert to acid and alkaline electrolytes, which has good resistance to elevated temperature in the presence of such electrolytes, and which can be readily inserted into the edge cavity 60, including polyvinyl resins and rubber type material such as neoprene type compounds and ethylene-propylene rubbers.

The unit 51 has applied to the outer surface thereof as by dipping, spraying, brushing and the like, e.g., by dipping in the above noted slurry containing inorganic materials and polymeric bonding agent, as described above, a flexible film 61 completely encasing the "wafer" unit 51, except for its upper surface 63', as seen in FIGS. 5 and 5a. It will be noted that the flexible envelope 61 is in contact with the outer surfaces of the separators 54 and 56 of the unit.

FIG. 6 illustrates incorporation of the electrode-separator units, or wafers, of FIGS. 5 and 5a to form a battery illustrated at 64. In this embodiment, the separator unit 51 containing a zinc electrode 52 and the flexible separator film 61 is disposed adjacent and in contact with a conventional silver electrode 63. Leads 66 and 68 are in contact with the zinc and silver electrodes 52 and 63, respectively, and such terminal wires are brought through the plastic electrode sections at the top of the battery case and connected to terminals 65 and 67.

Referring now to FIGS. 7 and 8 of the drawing, a multiplate battery is provided containing four zinc electrode-separator wafers, or units, 51 of FIG. 5 and positioned in alternating manner between such electrode-separator wafer units 51 are positioned five conventional silver electrodes 63, the electrode-separator wafers 51 containing the zinc electrodes 52 and the flexible inorganic separator film 61, being in contact with the adjacent silver electrodes 63. This assembly is positioned in a battery case 70.

Conductive electrode tabs or ribbons 74, which are connected to the zinc electrodes 52, are attached to a terminal 76 mounted on the battery cover 78. Likewise conductive tabs 80, which are connected to the upper end of the silver electrodes 63, are connected to a second terminal 82, also mounted on the battery cover.

The thickness of the rigid inorganic separators such as 10, 54 and 56, can vary, and can range, for example, from about 0.010" to about 0.030", although this range is only understood to be exemplary. For high rate battery applications, the thickness of the flexible film such as 12, 14, 16 and 61 is preferably made thin, e.g. of the order of 0.001", in order to reduce resistivity to a minimum. Where the thickness of the flexible coating is increased, e.g. to about 0.008 to about 0.010", which increases the resistivity, such thick flexible coatings are generally employed in low rate batteries.

The thickness of the electrodes, e.g., the zinc and silver electrodes 52 and 63, can of course, vary and can range, to example, from about 0.010" to about 0.150".

The following are examples of practice of the invention:

EXAMPLE 1

A five ampere hour (a.h.) silver-zinc battery is assembled as described above and illustrated in FIGS. 7 and 8 of the drawing, employing five silver electrodes and four electrode-separator wafer units of the type illustrated at 51 in FIG. 5, the silver electrodes and zinc electrode-separator units being positioned in alternate relation with silver electrodes being disposed at the opposite ends of this battery pack, as illustrated in FIG. 7.

Each of the zinc electrode-separator units is produced employing as the separators corresponding to 54 and 56 in FIG. 5, porous, rigid, sintered olivine separators consisting of a solid solution of magnesium silicate and iron silicate prepared by sintering at 1200° C. a natural olivine consisting essentially of 41.4% $SiO_2$, 49.3% MgO and 7.7% iron oxides (FeO and $Fe_2O_3$) by weight, the remainder consisting essentially of trace amounts of CaO, $Al_2O_3$ and $Cr_2O_3$.

The zinc electrode-separator units are produced by placing the zinc electrode 52 between and in contact with two of the above noted sintered olivine separators 54 and 56, with a cavity disposed around the periphery of the zinc electrode, and an epoxy cement or paste is injected into the edge cavity around the electrode and between the edge portions of the separator, and such epoxy resin is then cured by heating the assembly, e.g., at temperature about 150° F. for about two hours.

The zinc electrode-separator wafer unit thus produced is dipped into a slurry under vibration and stirring, such slurry consisting of a solids mixture in chloroform consisting of 76% of the above magnesium silicate-iron silicate solid solution in ground powder form, 4% of potassium titanate fibers chopped into short lengths of the order of about 0.008", or less, 10% polyphenylene oxide and 10% polpropylene polyazelate, marketed as Plastolein P-9750, and having an average molecular weight of about 2200. The polyphenylene oxide and polypropylene polyazelate are dissolved in the chloroform. The solids concentration of the slurry is about 60%.

The zinc electrode-separator composite with the coating of flexible film forming material thereon is removed from the slurry, is air-dried for 15 minutes to remove solvent and the coating is then oven cured for 15 minutes at 350° F.

The resulting film is highly flexible, has a porosity of about 15%, a thickness of about 0.001", and a pore size ranging from about 5 to about 100 angstroms, and has good strength.

The 5 a.h. battery containing these zinc electrode-separator units and silver electrodes are subjected to cycling at about 20° C., using a cycling regime of two hours discharge at 2.5 amperes to 100% depth of discharge, and a four hour charge cycle at 1.35 amperes, at a current density of 20 ma. cm.$^2$ during discharge and 12 ma. cm.$^2$ during charging. A 110% overcharge is applied in each charge cycle.

The battery continues to operate for 271 cycles using the above cycling regime in each case to 100% depth of discharge, without failure.

On the other hand, the same 5 a.h. battery employing zinc and silver electrodes with rigid olivine separators between the electrodes, such olivine separators not having a flexible inorganic film applied thereto, and otherwise operated under the same cycling regime as noted above, are capable of substantially less than 271 charge-discharge cycles employing the above noted cycling regime, to 100% depth of discharge in each cycle, due to damage or cracking of the rigid separator under these rigorous operating conditions.

The procedure of Example 1 is followed in each of Examples 2 to 8 listed in Table 1 below, employing various types of rigid inorganic separators, various flexible film formulae, and varying cycling regimes and depth of discharge, as noted in the table Thus, in Column A of Table 1 is given the formula for the rigid inorganic separator material, all of which are inorganic solid solutions of the compositions set forth in the respective formulae, except for the alumina separator ($Al_2O_3$); in Column B is given the formula of the mixture of inorganic and organic components employed in the slurry for producing the flexible film on the rigid inorganic separator and in Column C there is set forth the thickness of the flexible film formed on the rigid inorganic separator. Column D sets forth the total number of cycles for the respective cycling regimes set forth in Column E, and Column F sets forth the depth of discharge during each of the discharge portions of the corresponding charge-discharge cycling regime. Each of the rigid separators noted in Column A and overcoated with the corresponding flexible film obtained by the formula in Column B, is incorporated in a multiplate battery as illustrated in FIGS. 7 and 8, and described in Example 1 above, the resulting battery when tested by the cycling regimes of Column E and depth of discharge in Column F giving the results in total cycles given in Column D. The batteries of Examples 2 and 4 to 8 are operated at 20° C. and the battery of Example 3 is operated at 100° C.

TABLE 1

| Example No. | A<br>Rigid separator | B<br>Flexible film formula | Percent | C<br>Thickness of flexible film, in. | D<br>Total cycles | E<br>Cycling regimes and rates | F<br>Depth of discharge |
|---|---|---|---|---|---|---|---|
| 2 | $MgO \cdot FeO \cdot SiO_2$ | $MgO \cdot FeO \cdot SiO_2$<br>KT<br>PPO | 94<br>1<br>5 | 0.001 | 85 | 2 hrs. discharge at 2.5 a.[2], 4 hrs. charge at 1.35 a. | 100% of rated capacity. |
| 3 | $MgO \cdot FeO \cdot SiO_2$ | $MgO \cdot FeO \cdot SiO_2$<br>KT<br>PPO<br>P-9750 | 76<br>4<br>10<br>10 | 0.001 | [1] 489 | 1 hr. discharge at 2.5 a., 3 hrs. charge at 0.92 a. | 50% of rated capacity. |
| 4 | $FeO \cdot Cr_2O_3$ | $ZrO_2$<br>KT<br>PPO<br>P-9750 | 76<br>4<br>10<br>10 | 0.002 | 102 | 2 hrs. discharge at 2.5 a., 4 hrs. charge at 1.35 a. | 100% of rated capacity. |
| 5 | $MgO \cdot Cr_2O_3 TiO_2$ | $Al_2O_3$<br>KT<br>PPO<br>P-9750 | 76<br>4<br>10<br>10 | 0.003 | 89 | do | Do. |
| 6 | $Al_2O_3$ | $MgO \cdot FeO \cdot SiO_2$<br>KT<br>PPO | 94<br>1<br>5 | 0.001 | 55 | do | Do. |
| 7 | $MgO \cdot Cr_2O_3$ | $FeO \cdot Cr_2O_3$<br>KT<br>PPO<br>P-9750 | 76<br>4<br>10<br>10 | 0.001 | 163 | 4 hrs. discharge at 1 a., 8 hrs. charge at 0.55 a. | 80% of rated capacity. |
| 8 | $MgO \cdot FeO \cdot SiO_2$ | $ZrO_2 \cdot Cr_2O_3$<br>KT<br>PPO<br>P-9750 | 76<br>4<br>10<br>10 | 0.002 | 455 | 1 hr. discharge at 1.25 a., 3 hrs. charge at 0.47 a. | 25% of rated capacity. |

[1] 100° C.  [2] Amperes.

It is seen from the above table that by employing a rigid inorganic separator having applied thereto an overcoating of a flexible essentially inorganic film, when the resulting separator member is incorporated in a battery, particularly a high energy density silver-zinc battery, such battery can be subjected to a rigorous cycling regime including deep discharge cycles, e.g. ranging from 50% to 100% depth of discharge, and continue to operate successfully over a large number of discharge-charge cycles at both ambient temperature and at elevated temperature, e.g. of the order of 100° C. without deterioration of the separator member.

It is also observed that in Examples 4 and 8 employing iron-containing rigid inorganic separators and iron-free flexible separator films of zirconia (Example 4) and zirconia and chromic oxide (Example 8), gassing of the battery is essentially eliminated.

Additional examples of practice of the invention are set forth in Examples 9 and 10, the data for which is noted in Table 2 below. In these examples a single rigid inorganic separator is overcoated in the manner described in Example 1 above, with a flexible substantially inorganic film, as illustrated in FIGS. 2 and 2a, and a pair of such coated separators is incorporated in a battery containing two silver electrodes and one zinc electrode, one of such separators being disposed between one silver electrode and the zinc electrode and another such separator member being disposed between the zinc electrode member and the other silver electrode. In Example 9 below, the resulting battery is a 2 a.h. battery, and in Example 10 the resulting battery is a 1.5 a.h. battery.

results in extending the deep discharge life of the battery.

In Tables 1 and 2 above the olivine type separator material represented by the formula $MgO \cdot FeO \cdot SiO_2$ has the same composition as set forth in Example 1, the ferrochromite separator material represented by formula $FeO \cdot Cr_2O_3$ in Examples 4, 7 and 10 is composed of about 32% iron oxide and 68% chromic oxide and the rigid inorganic separator material of Example 5 is composed of about 60% magnesium oxide and about 40% of the combination of chromic oxide and titanium oxide. The magnesium oxide-chromic oxide rigid inorganic separator material of Example 7 is composed of about 95% of magnesium oxide and 5% chromic oxide.

The expression "KT" in Column B of Tables 1 and 2 represents potassium titanate fibers of the type employed in Example 1; the expression "PPO" represents polyphenylene oxide; and the expression "P-9750" represents the same polypropylene polyazelate component employed in Example 1 above.

EXAMPLE 11

The procedure of Example 1 is repeated except that in place of the zinc electrodes, cadmium electrodes are employed to form the electrode-separator composite of the type of 51 in FIG. 5.

When employed in a multiplate battery as described in Example 1 and illustrated in FIG. 7, with five silver electrodes, a silver-cadmium battery is provided having extended deep discharge life and good electrical efficiency as a result of the application of the flexible inorganic separator film over the rigid separators of the cadmium-containing electrode-separator assembly.

TABLE 2

| Example No. | A<br>Rigid separator | B<br>Flexible film formula | Percent | C<br>Thickness of flexible film, in. | D<br>Total cycles | E<br>Cycling regimes and rates | F<br>Depth of discharge |
|---|---|---|---|---|---|---|---|
| 9 | $MgO \cdot FeO \cdot SiO_2$ | ZrO<br>KT<br>PPO<br>P-9750 | 76<br>4<br>10<br>10 | 0.001 | 75 | 2 hrs. discharge at 1 a.[1], 18 hrs. charge at 120 ma.[2] | 100% of rated capacity. |
| 10 | $MgO \cdot Cr_2O_3 \cdot TiO_2$ | $FeO \cdot Cr_2O_3$<br>KT<br>PPO<br>P-9750 | 76<br>4<br>10<br>10 | 0.001 | 325 | 1 hr. discharge at 0.5 a., 3 hrs. charge at 0.2 a. | 33% of rated capacity. |

[1] Amperes.  [2] Milliamps.

Again, it will be noted from Examples 9 and 10 above, particularly Example 9, that the incorporation of the rigid inorganic flexible separator containing a flexible inorganic separator film in a battery such as a silver-zinc battery

EXAMPLE 12

The procedure of Example 1 is repeated employing in place of the zinc electrode in the electrode-separator composite 51 illustrated in FIG. 5, a cadmium electrode and incorporating such composites in a multi-plate battery as described in Example 1 and illustrated in FIG. 7, employing five nickel electrodes.

The resulting nickel-cadmium multiplate battery employing the cadmium-separator composite illustrated at 51 in FIG. 5 and containing a flexible inorganic separator over the rigid separator has good electrical efficiency and extended deep discharge life.

During discharge of batteries such as those described and illustrated above, as is well known, e.g., in the case of a silver-zinc battery, the zinc converts to zinc oxide and the silver oxide to silver, and during charging of such batteries the silver is oxidized to silver oxide and the zinc oxide is reduced to zinc. Because of these reversible reactions, the terms "silver" and "zinc," the terms "silver" and "cadmium," and the terms "nickel" and "cadmium," referring to the metals forming the respective electrodes of silver-zinc, silver-cadmium, and nickel-cadmium battery systems, are intended to denote either the respective metals themselves or the corresponding oxides thereof.

From the foregoing, it is seen that the invention provides an improved separator which as noted in the specific examples above, has extended deep discharge life, permitting operation of a secondary battery, particularly a high energy density battery, over a large number of charge-discharge cycles with depth of discharge down to 100%, by applying an essentially inorganic flexible composite separator material over a rigid inorganic separator.

While we have described particular embodiments of our invention for purposes of illustration within the spirit of the invention, it will be understood that the invention is not to be taken as limited except by the scope of the appended claims.

We claim:

1. An improved essentially inorganic separator member for a high energy density battery, comprising a porous rigid inorganic separator containing a coating of a flexible porous substantially inorganic separator film, said flexible porous separator film consisting essentially of a major portion of an inorganic material, a minor portion of potassium titanate fibers, and a minor portion of a cured organic polymer bonding the particles of said inorganic material and said potassium titanate fibers together, said separator member having increased resistance to failure and reduced tendency to cause shorting when operated at deep discharge in a battery, said flexible separator film remaining substantially intact when said rigid separator develops cracks.

2. An improved essentially inorganic separator member as defined in claim 1, wherein said rigid porous separator and said flexible porous separator film consist essentially of the same inorganic material.

3. An improved essentially inorganic separator member as defined in claim 1, wherein said rigid porous separator and said flexible porous separator film are composed of different inorganic materials.

4. An improved essentially inorganic separator member as defined in claim 1, wherein said flexible porous separator film includes a minor portion of an organic component selected from the group consisting of monomeric and polymeric azelate, pelargonate and oleate esters.

5. A separator member as defined in claim 1, wherein said organic polymer is polyphenylene oxide, said potassium titanate particles are in short fiber form, said separator having a pore size ranging from about 1 to about 400 angstroms, and said flexible porous separator film having a thickness of about 0.0005" to about 0.025".

6. A separator member as defined in claim 5, said flexible porous separator film including a minor portion of polypropylene polyazelate having an average molecular weight ranging from about 850 to about 6,000.

7. A battery comprising a pair of electrodes of opposite polarity and positioned between said electrodes for retaining electrolyte, a separator member as defined in claim 5.

8. A battery comprising a pair of electrodes of opposite polarity and positioned between said electrodes for retaining electrolyte, a separator member as defined in claim 6.

9. A separator member as defined in claim 1, wherein said rigid inorganic separator is in the form of a unit comprising a pair of porous rigid inorganic separators and an electrode positioned between said separators, said separators each having an overlapping edge portion extending beyond said electrode and forming an edge cavity between the separators and around said electrode, and a sealant in said edge cavity around said electrode, said flexible porous separator film being applied to the outer surfaces of said pair of separators and to edge portions of said unit.

10. A battery comprising a unit as defined in claim 9, and a second electrode, said unit and said second electrode being in side by side relation, said second electrode having a polarity opposite to the electrode of said unit.

11. A battery as defined in claim 10, including a plurality of said units and a plurality of said second electrodes arranged in side by side relation, with said units in alternating arrangement with said second electrodes.

12. A battery comprising a pair of electrodes of opposite polarity and positioned between said electrodes for retaining electrolyte, a separator member as defined in claim 1.

13. A battery as defined in claim 12, wherein said organic polymer of said flexible film is polyphenylene oxide, said potassium titanate particles are in short fiber form, said separator having a pore size ranging from about 1 to about 400 angstroms, and said flexible porous separator film having a thickness of about 0.0005" to about 0.025".

14. A battery as defined in claim 13, said flexible porous separator film including a minor portion of polypropylene polyazelate having an average molecular weight ranging from about 850 to about 6,000.

15. A battery as defined in claim 12, including a plurality of said separator members in alternating side by side relation, and a plurality of said pairs of electrodes of opposite polarity in side by side relation with and between said alternating separator members.

16. An improved essentially inorganic separator member for a high energy density battery, comprising a porous rigid inorganic separator containing a coating of a flexible porous substantially inorganic separator film, said flexible porous separator film consisting essentially of a major portion of an inorganic material, a minor portion of potassium titanate fibers, and a minor portion of a cured organic polymer bonding the particles of said inorganic material and said potassium titanate fibers together, said separator member having increased resistance to failure and reduced tendency to cause shorting when operated at deep discharge in a battery, the inorganic material of said rigid separator and said flexible separator film consisting essentially of a member selected from the group consisting of insoluble hydrous metal oxides, aluminosilicates, a solid solution of magnesium silicate and a member selected from the group consisting of zinc silicate and iron silicate, a solid solution of an aluminum-bearing material and a substance selected from the group consisting of chromium, cobalt, nickel, magnesium, calcium and iron-bearing materials, a solid solution of a major portion of magnesium oxide and a minor portion of an oxide selected from the group consisting of zirconium dioxide, chromic oxide, aluminum oxide and titanium oxide, a solid solution of ferrochromite, zirconia, spinelloids, alumina, and magnesium silicate.

17. A separator member as defined in claim 16, wherein the inorganic material of both said rigid inorganic separator and said flexible film is essentially a solid solution of magnesium silicate and iron silicate.

18. A separator member as defined in claim 16, wherein the inorganic material of said rigid inorganic separator is a solid solution of magnesium silicate and iron silicate and the inorganic material of said flexible film is zirconia.

19. An improved essentially inorganic separator member as defined in claim 16, wherein said inorganic material of said rigid separator is a solid solution of magnesium silicate and iron silicate, and said inorganic material of said separator film is a substantially iron-free inorganic material.

20. An improved essentially inorganic separator member as defined in claim 16, wherein said organic polymer is a member selected from the group consisting of polyphenylene oxide and polysulfone.

21. A battery comprising a pair of electrodes of opposite polarity and positioned between said electrodes for retaining electrolyte, a separator member as defined in claim 16.

References Cited

UNITED STATES PATENTS

| 3,022,366 | 2/1962 | Kilroy | 136—145 |
| 3,542,596 | 11/1970 | Arrance | 136—6 |
| 3,014,085 | 12/1961 | Bachman | 136—145 |
| 3,364,077 | 1/1968 | Arrance et al. | 136—146 |

OTHER REFERENCES

Arrance et al. patent application Ser. No. 810,945 filed Mar. 27, 1969.

DONALD L. WALTON, Primary Examiner

U.S. Cl. X.R.

117—121; 136—146